(12) United States Patent
Lee et al.

(10) Patent No.: US 11,685,665 B2
(45) Date of Patent: Jun. 27, 2023

(54) METHOD FOR PREPARING SEA URCHIN-SHAPED ZINC OXIDE NANOWIRE

(71) Applicant: INDUSTRY-ACADEMIC COOPERATION FOUNDATION, YONSEI UNIVERSITY, Seoul (KR)

(72) Inventors: Kyu Hyoung Lee, Seoul (KR); Changhyun Jin, Incheon (KR); Myung Sik Choi, Yangju-si (KR)

( * ) Notice: Subject to any disclaimer, the term of this patent is extended or adjusted under 35 U.S.C. 154(b) by 188 days.

(21) Appl. No.: 17/396,611

(22) Filed: Aug. 6, 2021

(65) Prior Publication Data
US 2022/0081312 A1    Mar. 17, 2022

(30) Foreign Application Priority Data
Sep. 16, 2020 (KR) .................. 10-2020-0119054

(51) Int. Cl.
   *C01G 9/03*      (2006.01)
   *B01J 19/12*      (2006.01)
   *B01J 19/00*      (2006.01)

(52) U.S. Cl.
CPC ............ *C01G 9/03* (2013.01); *B01J 19/0053* (2013.01); *B01J 19/126* (2013.01); *B01J 2219/00162* (2013.01); *B01J 2219/0277* (2013.01); *B01J 2219/1233* (2013.01); *B01J 2219/1242* (2013.01); *C01P 2004/16* (2013.01); *C01P 2004/30* (2013.01); *C01P 2004/64* (2013.01)

(58) Field of Classification Search
CPC .... C01G 9/03; C01P 2004/30; C01P 2004/16; C01P 2004/64; B01J 19/126; B01J 19/0053; B01J 2219/1242; B01J 2219/00162; B01J 2219/0277; B01J 2219/1233; B82B 1/008; B82B 3/0095
See application file for complete search history.

(56) References Cited

FOREIGN PATENT DOCUMENTS

| CN | 103 074 658 A | * | 5/2013 | |
|---|---|---|---|---|
| CN | 104 326 504 A | * | 2/2015 | ............... C01G 9/02 |
| CN | 104 607 194 A | * | 5/2015 | |
| CN | 108 163 883 A | * | 6/2018 | ............... C01G 9/02 |
| CN | 111 252 805 A | * | 6/2020 | ............... C01G 9/02 |
| CN | 113 996 326 A | * | 2/2022 | ............... B01J 35/08 |
| CN | 115 429 701 A | * | 12/2022 | |
| JP | 2004 115 325 A | * | 4/2004 | |
| KR | 10-2004-0070117 | | 8/2004 | |

OTHER PUBLICATIONS

Hyoun Woo Kim et al., "Synthesis of zinc oxide semiconductors-graphene nanocomposites bymicrowave irradiation for application to gas sensors", Sensors and Actuators B: Chemical, 2017, 249, pp. 590-601.

F. Solis-Pomar et al., "Rapid synthesisandphotocatalyticactivityof ZnOnanowiresobtained throughmicrowave-assistedthermaldecomposition", Ceramics International, 2016, 42, pp. 18045-18052.

* cited by examiner

*Primary Examiner* — Timothy C Vanoy

(74) *Attorney, Agent, or Firm* — Antonio Ha & U.S. Patent, LLC

(57) ABSTRACT

According to an embodiment, a method for preparing a sea urchin-shaped zinc oxide (ZnO) nanowire comprises preparing a mixture of a ZnO nano-powder and a graphite powder and irradiating the mixture, in a container, with a microwave.

15 Claims, 8 Drawing Sheets

METHOD FOR PREPARING SEA URCHIN-SHAPED ZINC OXIDE NANOWIRE

CROSS-REFERENCE TO RELATED APPLICATION(S)

This application is based on and claims priority under 35 U.S.C. 119 to Korean Patent Application No. 10-2020-0119054, filed on Sep. 16, 2020, in the Korean Intellectual Property Office, the disclosure of which is herein incorporated by reference in its entirety.

TECHNICAL FIELD

The disclosure relates to a method for manufacturing sea urchin-shaped ZnO nanowires and, more specifically, to a method for manufacturing sea urchin-shaped ZnO nanowires by three-dimensionally growing ZnO nanowires around ZnO nuclei to be shaped as sea urchins.

DESCRIPTION OF RELATED ART

Nano-sized substances and materials, which have new electrical, chemical, and mechanical properties, have recently been actively studied in science and technology fields. In particular, research on zinc oxide nanowires is rapidly increasing in recent years due to the various properties of zinc oxide. Zinc oxide, a wide and direct bandgap material, is promising for use in ultraviolet sensors and is being researched for use in saw elements and nanogenerators due to its piezo electric characteristics, as well as solar cells.

Further, zinc oxide may be easily prepared into one-dimensional nanowires, and well-aligned zinc oxide nanowires exhibit excellent field emission properties. There are ongoing research efforts to apply zinc oxide nano structures to solar cells, chemical sensors, field emission sources, and nanogenerators.

Attempts have been made to prepare ZnO nanowires by a low-cost liquid phase method. The liquid phase method prepares ZnO nanowires in an aqueous solution containing a surfactant, and the ZnO nanowires prepared by this method remain free-standing without being attached to the substrate in the solution. However, since the liquid phase method uses a surfactant to control the shape and size of the ZnO nanowires, the surfactant is present on the surface of the prepared ZnO nanowires, resulting in a contact resistance or energy barrier on the surface of the ZnO nanowires.

For this reason, there has been an attempt to manufacture ZnO nanowires in a dry method. In the case of vapor growth, ZnO nanowires are synthesized on a substrate by placing a catalyst, e.g., Au, on the substrate and applying, e.g., chemical vapor deposition (CVD), thereto under high temperature and high vacuum conditions. Resultant ZnO nanowires are produced, attached to the substrate, and are not easy to mass-produce.

The disclosure aims to provide a method that may three-dimensionally grow ZnO nanowires around ZnO nuclei in the shape of sea urchins, not in the form in which ZnO nanowires are attached to a substrate, and mass-produce ZnO nanowires within a short time.

According to an embodiment, a method for preparing a sea urchin-shaped zinc oxide (ZnO) nanowire comprises preparing a mixture of a ZnO nano-powder and a graphite powder and irradiating the mixture, in a container, with a microwave.

The graphite powder may be an expanded graphite powder.

The expanded graphite powder may be an expanded graphite powder sieved using a screen of 70 mesh to 90 mesh.

The container may be an alumina crucible.

1 part by weight to 20 parts by weight of the graphite powder may be mixed with 100 parts by weight of the ZnO nano-powder. In other words, the graphite powder and the ZnO nano-powder may be mixed together in a parts by weight ratio of 1 to 20:100.

The method may comprise, after preparing the mixture, ball-milling the mixture.

The ball-milling may be performed for 10 minutes to 60 minutes.

Irradiating the mixture in the container with the microwave may be repeated five times to 20 times, for 10 seconds to 60 seconds for each time.

The method may further comprise stirring the mixture between the times of irradiating the mixture in the container with the microwave.

The method may further comprise generating carbon oxide gas from the graphite powder in the mixture by energy of the microwave.

The container may include a lid. The method may further comprise increasing an internal pressure of the container up to 1 atmosphere to 5 atmospheres by the carbon oxide gas and randomly creating ZnO nuclei and the ZnO nanowires from the ZnO nano-powder in the mixture by opening the lid of the container with the increased internal pressure to thus reduce the internal pressure to atmospheric pressure.

The method may further comprise creating a spark from the graphite powder in the mixture by energy of the microwave.

The method may further comprise turning a whole or part of the ZnO nano-powder in the mixture into a dynamic state by the spark and randomly creating ZnO nuclei and the ZnO nanowires from the ZnO nano-powder in the dynamic state.

The method may further comprise generating carbon oxide gas and zinc (Zn) gas from the mixture by energy of the microwave.

The method may further comprise randomly creating ZnO nuclei and the ZnO nanowires from the Zn gas.

According to the embodiments of the disclosure, it is possible to mass-produce ZnO nanowires at low costs within a short time using high microwave energy by a method that three-dimensionally grows ZnO nanowires around ZnO nuclei in the shape of sea urchins.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Figure 1:
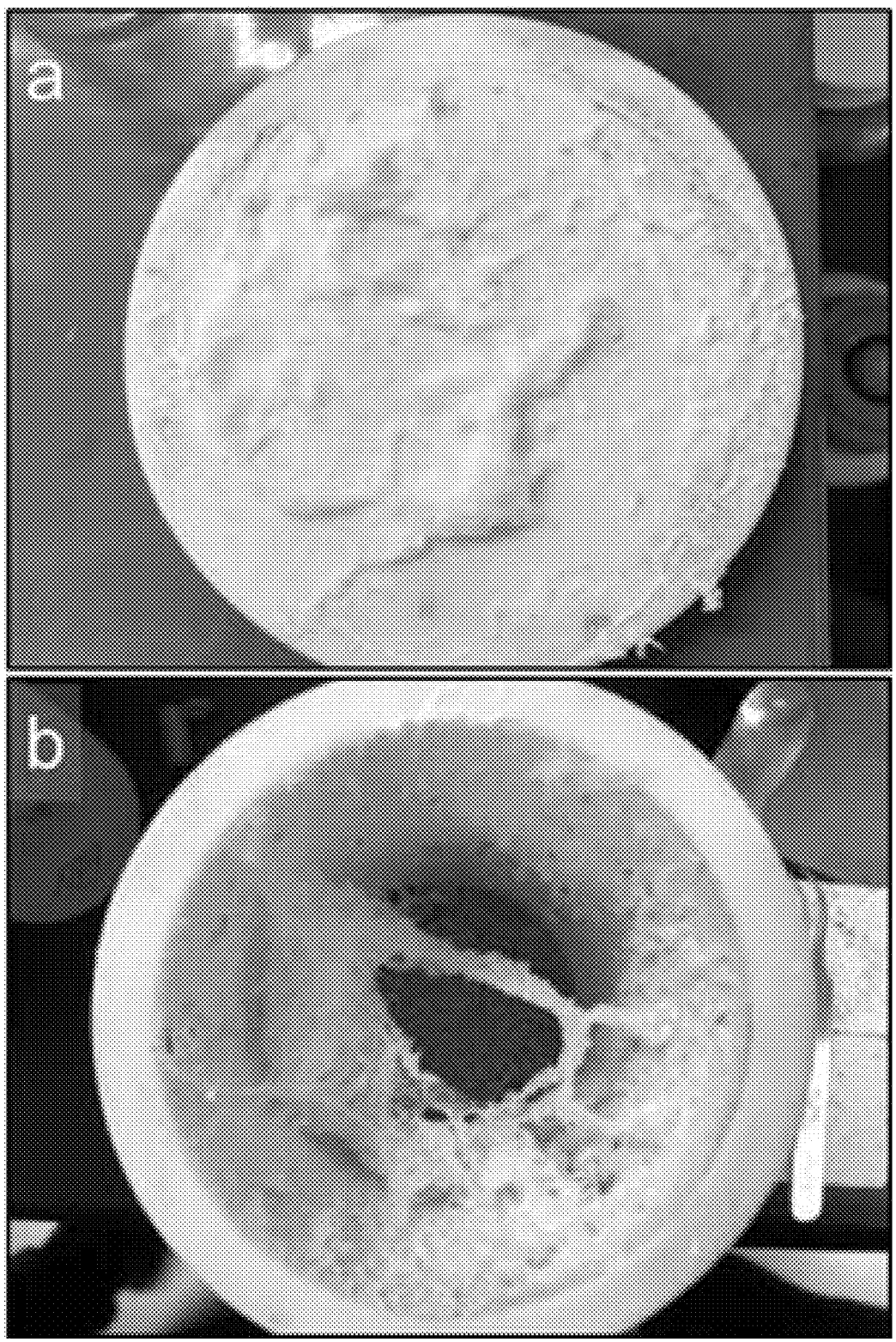
FIG. 1 shows sea urchin-shaped ZnO nanowires prepared according to an embodiment of the disclosure.

Hereinafter, exemplary embodiments of the inventive concept will be described in detail with reference to the accompanying drawings. The inventive concept, however, may be modified in various different ways, and should not be construed as limited to the embodiments set forth herein. Like reference denotations may be used to refer to the same or similar elements throughout the specification and the drawings.

When determined to make the subject matter of the disclosure unclear, the detailed description of the known art or functions may be skipped.

The terms as used herein are provided merely to describe some embodiments thereof, but not to limit the disclosure. As used herein, the singular forms "a," "an," and "the" are intended to include the plural forms as well, unless the context clearly indicates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the disclosure are described in detail. However, the scope of the disclosure is not limited to the embodiments disclosed herein but is defined by the appended claims.

A method for preparing sea urchin-shaped ZnO nanowires is described below, according to embodiments of the disclosure.

First, a Mixture is Prepared by Mixing a ZnO Nanopowder and a Graphite Powder (Step a).

Preferably, the graphite powder may be an expanded graphite powder.

Expanded graphite is graphite resultant from expanding crystalline graphite by 1005 to 250% in volume. For example, if crystalline graphite is oxidized by chromic acid and dilute sulfuric acid and quickly heated, oxide accumulates between the layers of the graphite, so that the graphite expands.

The expanded graphite powder may be one sieved by a 70- to 90-mesh screen, preferably a 75- to 85-mesh screen. If sieved using a screen of less than 70 mesh, the expanded graphite powder may agglomerate, which may deteriorate efficiency. If a screen of more than 90 mesh is used, the graphite powder may not be evenly dispersed with the ZnO (nano) powder.

1 part by weight to 20 parts by weight of the graphite powder, preferably 5 parts by weight to 10 parts by weight, may be mixed with 100 parts by weight of the ZnO nanopowder. If the graphite powder exceeds 20 parts by weight relative to 100 parts by weight of the ZnO nano-powder, the temperature of the container may become too high and may thus be broken. If the graphite powder is less than 1 part by weight, the temperature of the container may be not sufficient to build ZnO nuclei.

Additionally, the mixture may be ball-milled (step a-1).

The ball milling may be performed for 10 minutes to 60 minutes, preferably for 20 minutes to 40 minutes. If ball milling is performed for less than 10 minutes, dispersion may not be sufficient, and if ball milling exceeds 60 minutes, the mixture may be agglomerated by the generated heat.

Next, the Mixture is Placed in a Container and Irradiated with Microwave Waves (Step b).

The container may be an alumina crucible and, preferably, may include a lid.

Irradiation of microwaves may be repeated multiple times, rather than a single time.

For example, microwave irradiation may be performed five to 20 times, and each microwave irradiation step may be performed for 10 seconds to 60 seconds.

The step of stirring the mixture may be added between the above-described steps, but it is not that stirring the mixture should be performed before the irradiation of microwaves.

A method for preparing sea urchin-shaped ZnO nanowires includes three mechanisms as follows.

Figure 3:
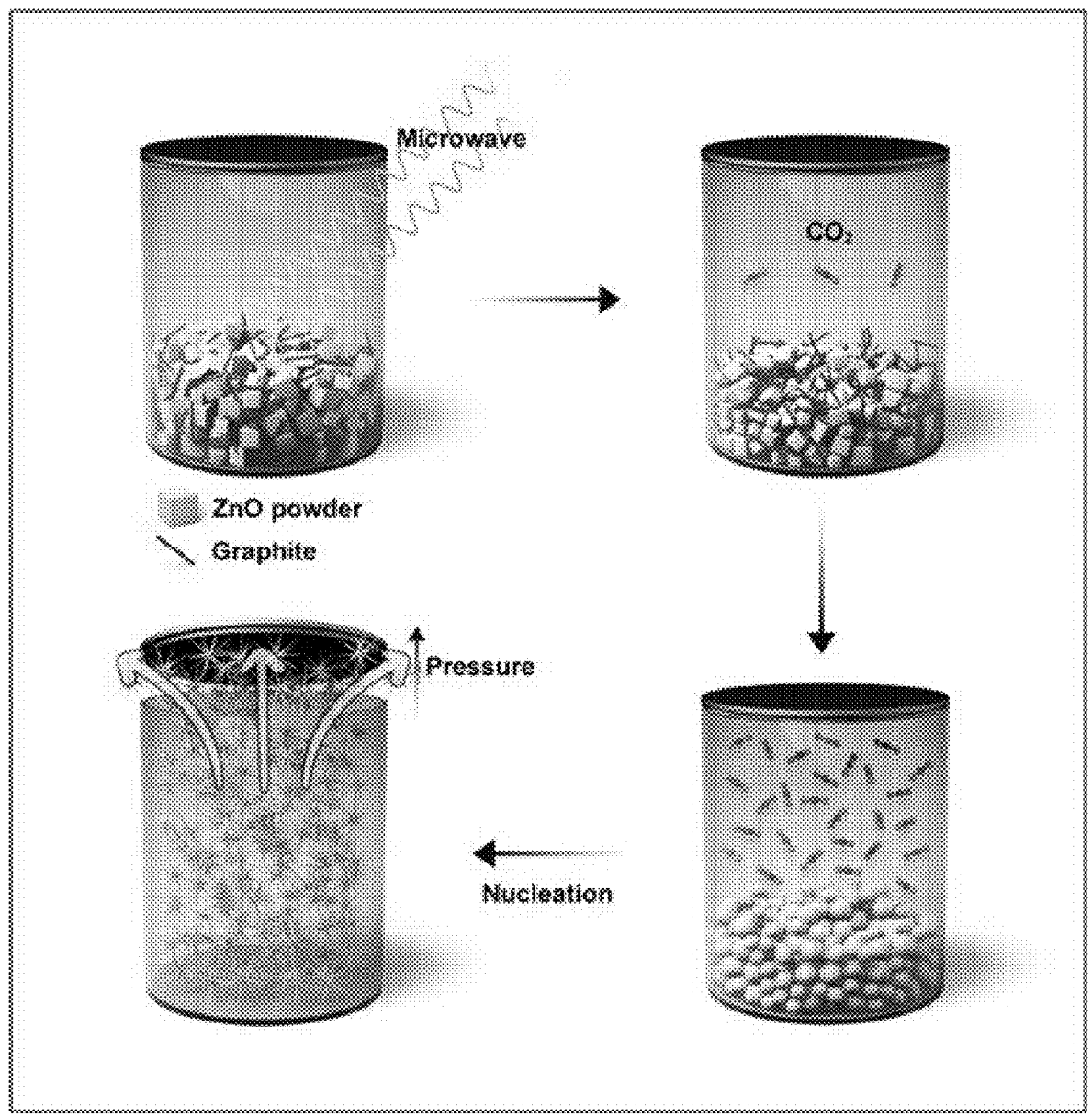
FIG. 3 is a view illustrating a first mechanism for a method for preparing sea urchin-shaped ZnO nanowires according to an embodiment of the disclosure.

In the first mechanism, referring to FIG. 3, the graphite powder included in the mixture generates carbon oxide gas by the energy of the irradiated microwave wave, and the internal pressure of the container is increased up to 1 atmosphere to 5 atmospheres by the carbon oxide gas. Preferably, the internal pressure of the container may be increased up to 1 atmosphere to 2 atmospheres.

In this case, the lid of the container is opened by the increased internal pressure, and the internal pressure is reduced to atmospheric pressure to randomly generate ZnO nuclei from the ZnO nanopowder included in the mixture and to grow ZnO nanowires.

More specifically, if the internal pressure becomes too large for the container to withstand, the lid is pushed up so that the internal pressure of the container is lowered. As the lid is opened, the internal pressure may instantaneously be lowered, so that growth may occur simultaneously with ZnO nucleation. In other words, the moment that the lid of the container is open, the energy condensed in the container while the lid is closed is used as a driving force for the growth as well as the explosive ZnO nucleation, and the energy is then lowered.

The carbon oxide gas may be carbon monoxide or carbon dioxide.

Figure 4:
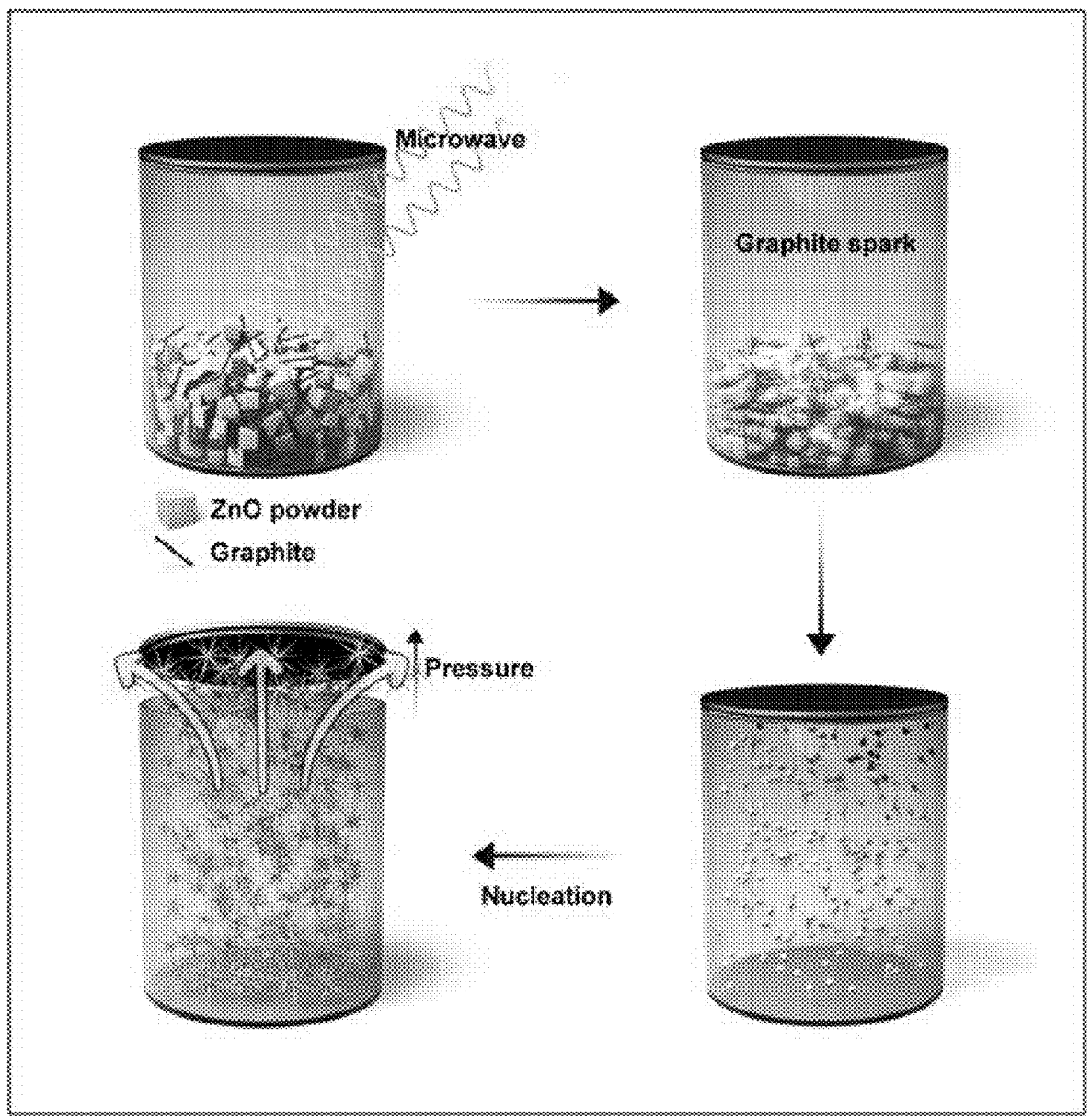
FIG. 4 is a view illustrating a second mechanism for a method for preparing sea urchin-shaped ZnO nanowires according to an embodiment of the disclosure.

In the second mechanism, referring to FIG. 4, the graphite powder included in the mixture generates a spark by the energy of the irradiated microwave, and the spark makes the whole or part of the ZnO nanopowder included in the mixture into a dynamic state, and ZnO nuclei may be generated and ZnO nanowires may be grown from the ZnO nanopowder in the dynamic state.

The dynamic state is a state in which the ZnO nanopowder bounces upward.

Specifically, if energy is instantaneously concentrated onto the graphite powder, and the graphite powder sparks, and the ZnO nano-powder thereby has a chance of bouncing up to the lid in the container. By injection of the high energy of microwave, the ZnO nano-powder may turn into the dynamic state, i.e., the bouncing-up state, and in that state, nucleation and growth may occur.

Figure 5:
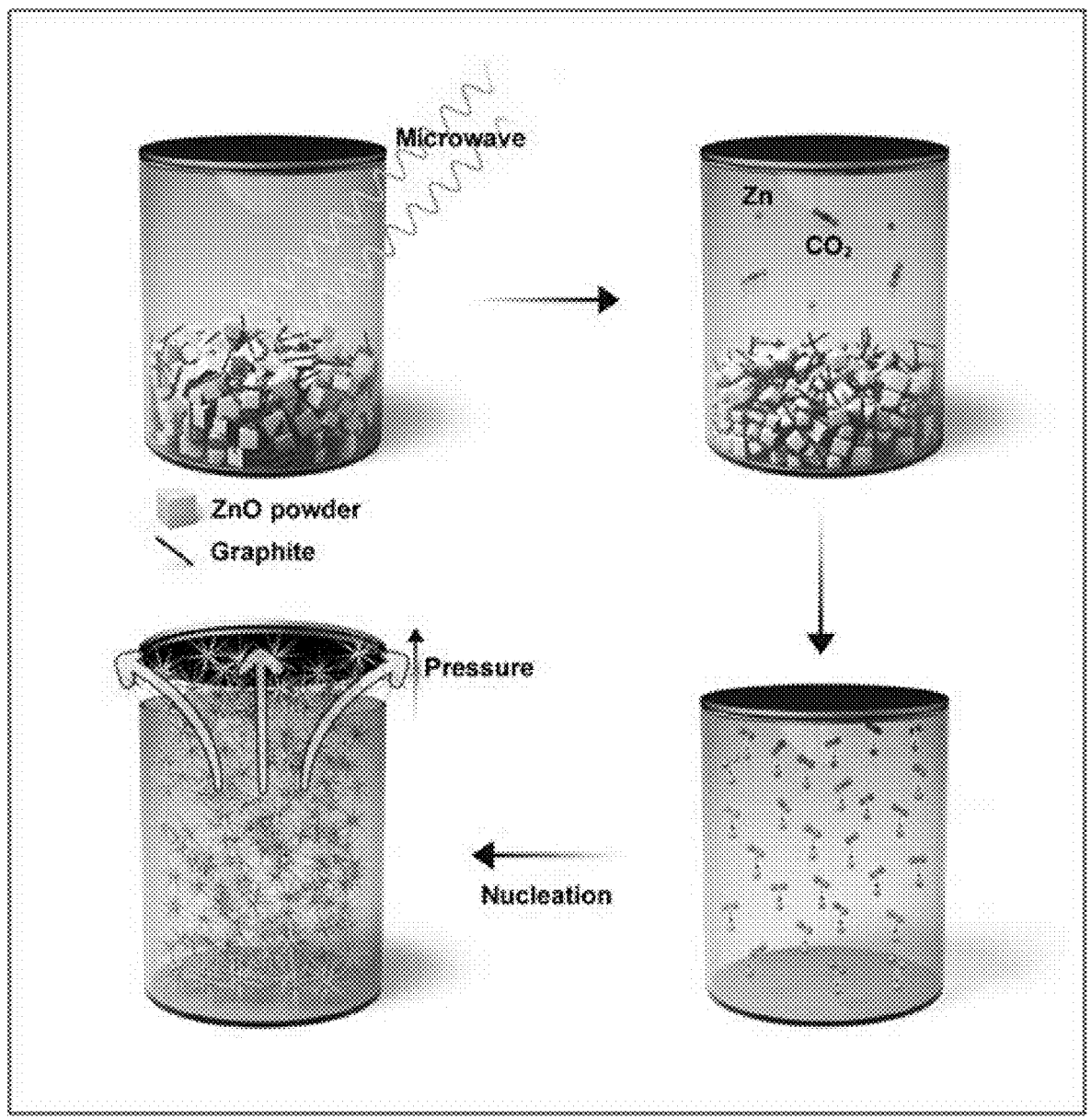
FIG. 5 is a view illustrating a third mechanism for a method for preparing sea urchin-shaped ZnO nanowires according to an embodiment of the disclosure.

In the third mechanism, referring to FIG. 5, the mixture generates carbon oxide gas and Zn gas by the energy of the irradiated microwave and, from the Zn gas, ZnO nuclei may be generated, and ZnO nanowires may be grown.

The radial and omnidirectional growth of ZnO nanowires from the nucleus like sea urchins is shown frequently in wet manufacturing methods, rather than dry manufacturing methods. This means that as the air in the container plays a role as a solution (medium) in the wet method, and Zn gas and oxygen are combined as in hydrothermal synthesis, ZnO nucleation may occur anywhere in the container, as long as there is threshold energy necessary for ZnO nucleation, and omni-directional ZnO nanowire growth is possible, rather than ZnO nucleation and growth occurring from a lower portion of the container, where the ZnO nano-powder and graphite powder are positioned.

Sea urchin-shaped ZnO nanowires may be prepared based on a proper combination of the above-described three mechanisms. However, sea urchin-shaped ZnO nanowire may be prepared according to any one of the three mechanisms.

EMBODIMENT

Hereinafter, embodiments of the disclosure are described in detail. However, the scope of the disclosure is not limited thereto.

Embodiment: Sea Urchin-Shaped ZnO Nanowires

ZnO nanopowder (commercially available from Daejung Chemicals & Metals Co., LTD) and expanded graphite (commercially available from Hyundai Coma Industry), which was sieved by an 80-mesh screen, were mixed at an 85:15 wt % ratio, and then stirred using a ball mill (e.g., Model BML-2 commercially available from Daihan Scientific Co., Ltd.) for 30 minutes, thereby preparing a mixture.

The mixture was placed in an alumina crucible and was irradiated with microwaves of a 2.45 GHz frequency and 1,000 W power using a microwave oven (e.g., Samsung Model MS23M4023AG), with the lid closed. The microwave irradiation was performed ten times each for 30 seconds. For the first to fifth microwave irradiation, the mixture was stirred using a spoon whenever each microwave irradiation was done. The sixth to tenth microwave irradiation was performed with the lid open, without the stirring step.

The results are shown in FIG. 1. It may be shown from FIG. 1 that a large amount of sea urchin-shaped ZnO nanowire were synthesized on the lid and inner wall of the alumina crucible. Sea urchin-shaped ZnO nanowires were also observed outside the alumina crucible having the lid, which means that the lid was opened due to the high pressure inside the alumina crucible and the sea urchin-shaped ZnO nanowires were ejected out of the alumina crucible.

Comparative Example 1: ZnO Nanoparticles Prepared by Conventional Hydrothermal Synthesis 5 mmol $Zn(Ac)_2 \cdot 2H_2O$ and 10 mmol ribose were measured and were stirred in 150 ml DI water for 30 minutes. Then, 10 mmol NaOH was added. Then, it was placed in a Teflon container for hydrothermal synthesis, and hydrothermal synthesis was performed at 90° C. for 2 hours. After the hydrothermal synthesis, the obtained powder was washed with DI water and dried in a vacuum oven at 80° C. for 2 hours. The dried powder was thermally treated in a box furnace at 400° C. for 4 hours.

Comparative Example 2: Commercially Available ZnO Nanoparticles

99% ZnO nanoparticles were purchased from Daejung Chemicals and used as Comparative Example 2.

EXPERIMENTAL EXAMPLES

Experimental Example 1: TEM Image and Per-Element Mapping Results

Figure 2:
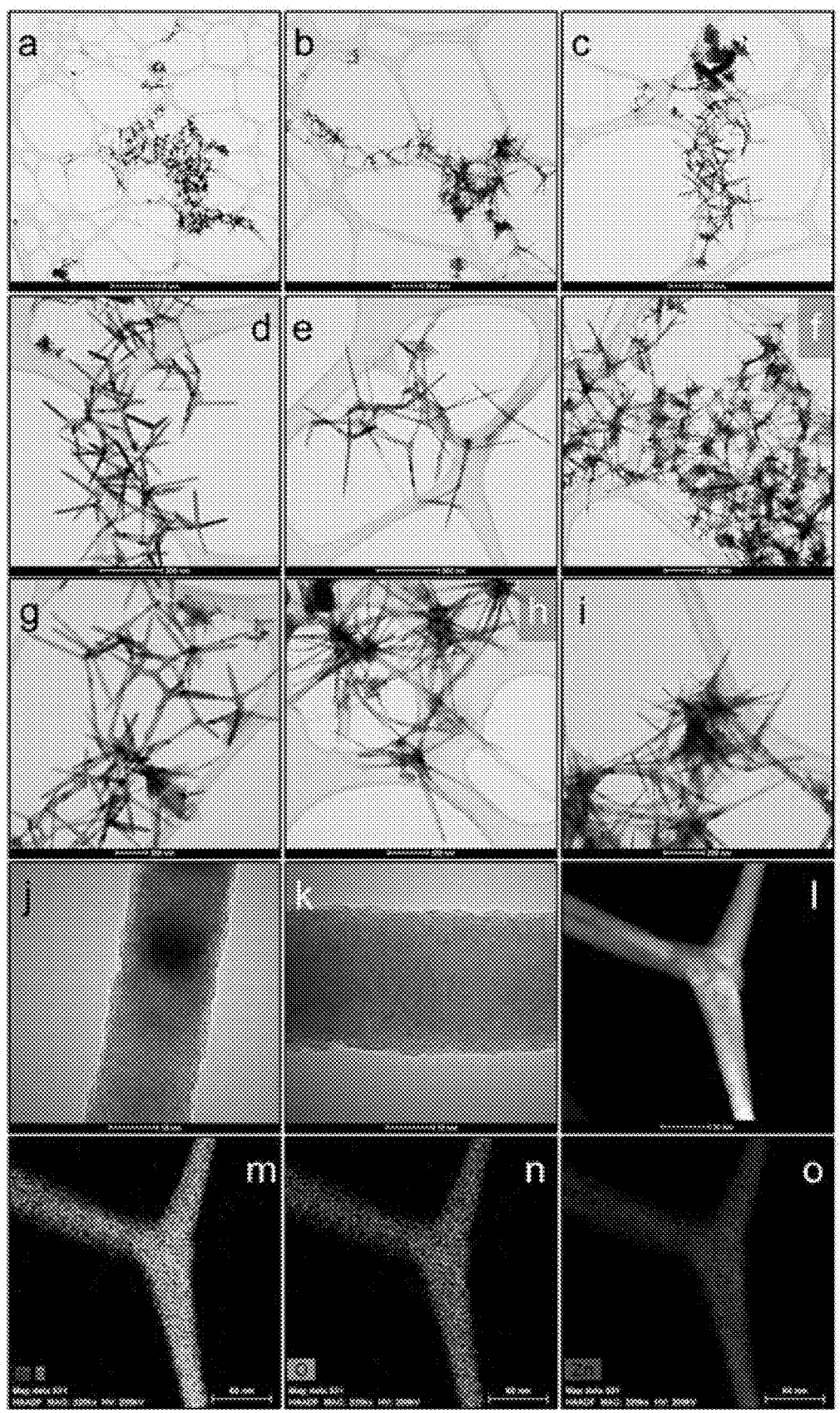
FIG. 2 shows TEM images and a composition of sea urchin-shaped ZnO nanowires prepared according to an embodiment of the disclosure.

FIG. 2 shows TEM images and per-element mapping results for sea urchin-shaped ZnO nanowire prepared according to an embodiment.

Referring to FIG. 2, it could be observed, at various magnifications (a to i), that sea urchin-shaped ZnO nanowires were synthesized according to an embodiment. It was also observed that ZnO nanowires were prepared from the per-element mapping results (j to o of FIG. 2) by which the components may be identified.

Experimental Example 2: Results of X-Ray Diffraction (XRD) and Photoluminescence (PL) Measurement FIG. 6 shows scanning electron microscopy (SEM) images of sea urchin-shaped ZnO nanowires (ZnO NW MW) prepared according to an embodiment and the results of XRD and PL measurement for the embodiment, Comparative Example 1 (ZnO NP hydrothermal) and Comparative Example 2 (ZnO NP commercial).

Figure 6:
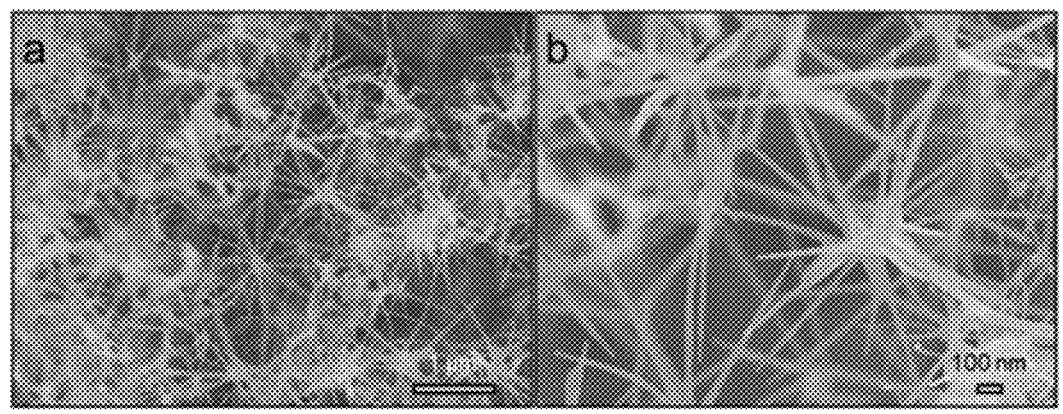
FIG. 6 shows a comparison in XRD and PL between a conventional ZnO nanowire structure and sea urchin-shaped ZnO nanowires prepared according to an embodiment of the disclosure.
Figure 6:
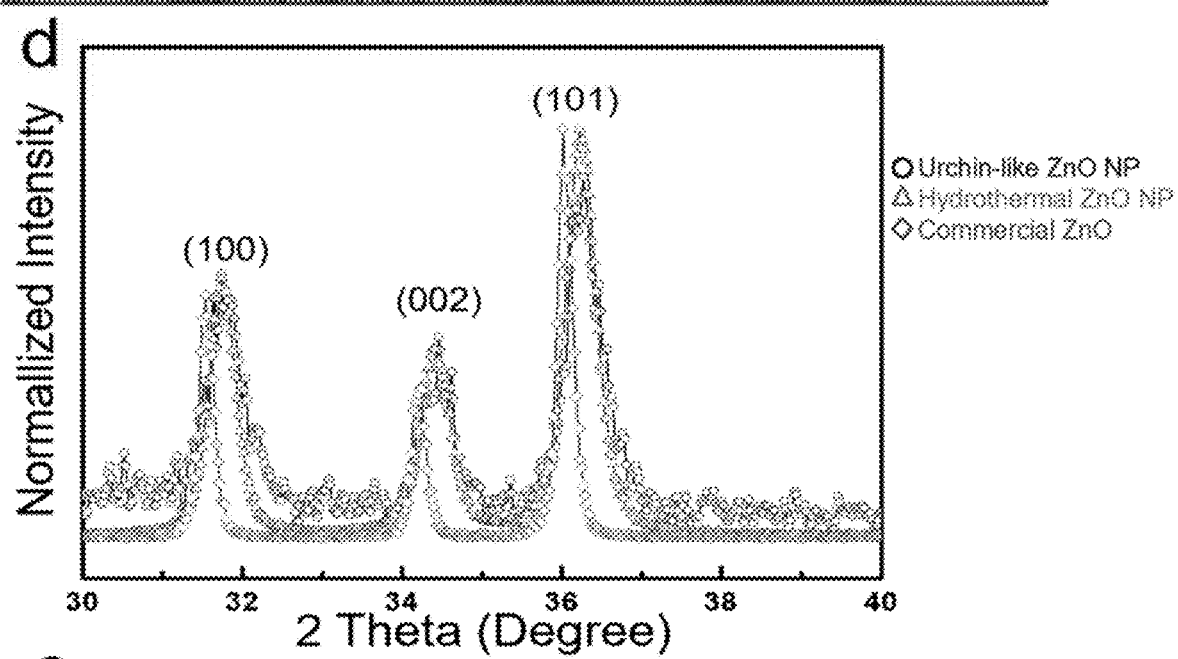
Figure 6:
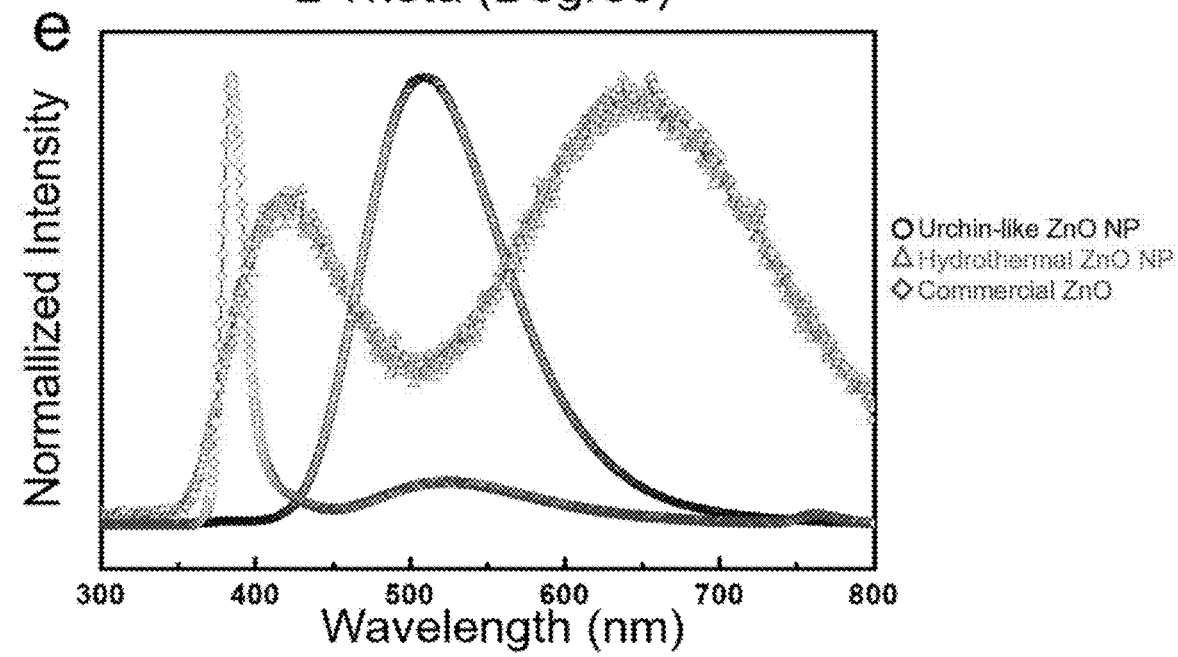

Referring to FIG. 6, it may be identified that crystallinity (XRD) and band gap (PL) vary due to the different types of defects caused by the difference in synthesis method.

Experimental Example 3: Results of SEM

Figure 7:
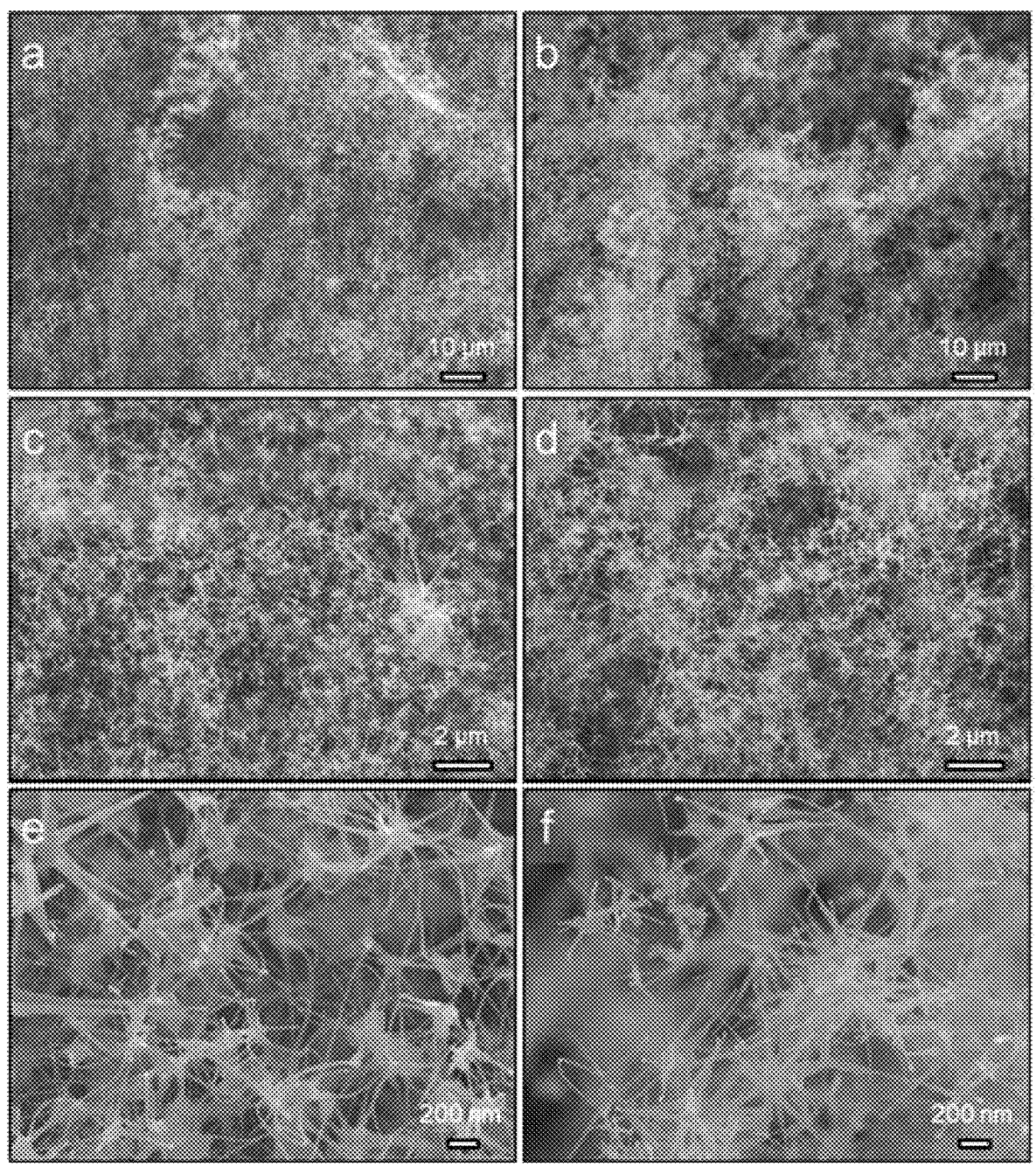
FIG. 7 shows SEM images of sea urchin-shaped ZnO nanowires prepared according to an embodiment of the disclosure.

FIG. 7 illustrates the results of SEM measurement for sea urchin-shaped ZnO nanowires prepared according to an embodiment.

It is identified from FIG. 7 that sea urchin-shaped ZnO nanowires are prepared in three dimension (3D) as described above.

Experimental Example 4: Distribution of Elements in Sea Urchin-Shaped ZnO Nanowires FIG. 8 is a graph illustrating a distribution of elements in sea urchin-shaped ZnO nanowires prepared according to an embodiment.

Figure 8:
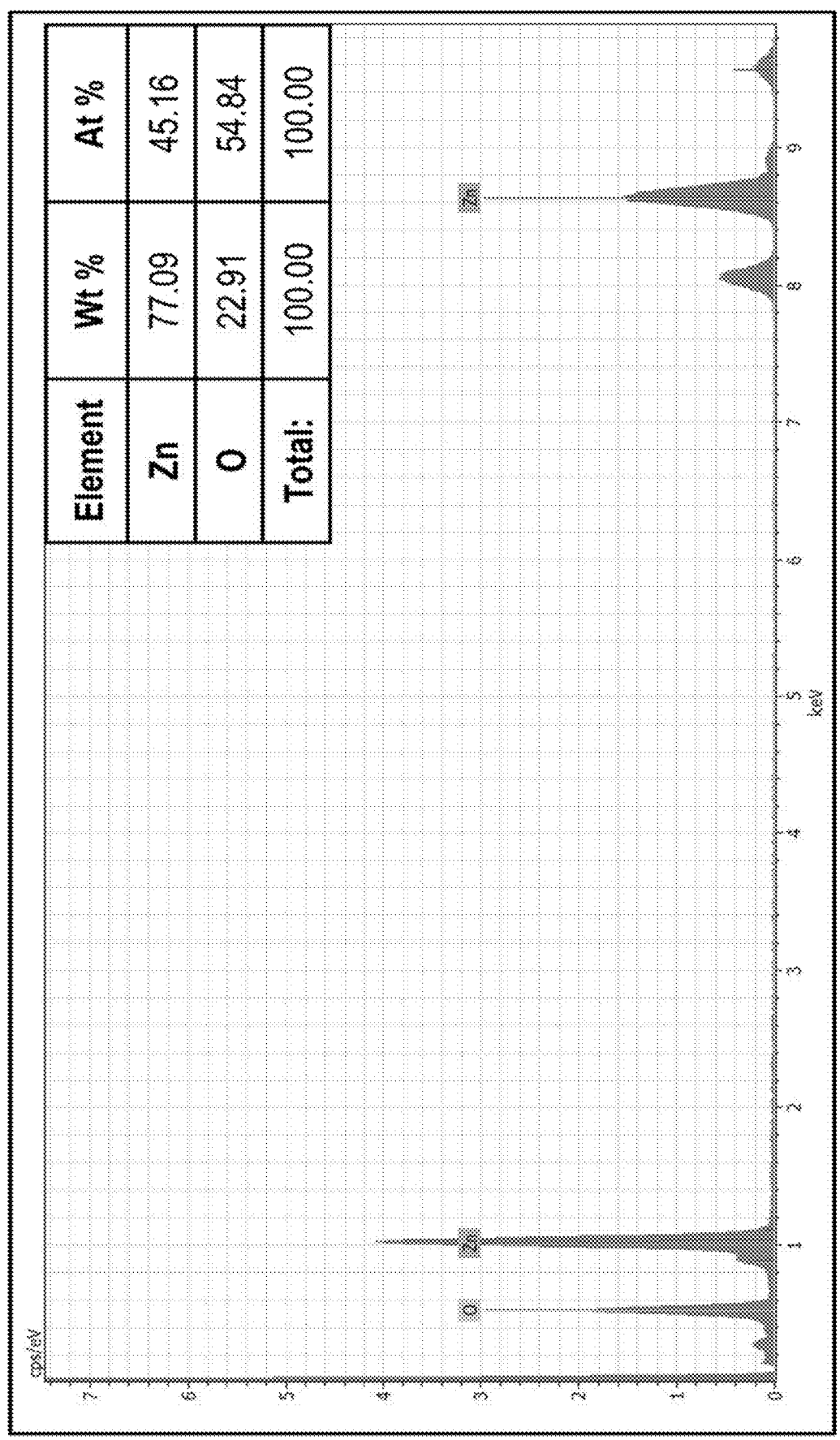
FIG. 8 is a graph illustrating a distribution of elements in sea urchin-shaped ZnO nanowires prepared according to an embodiment.

A composition of sea urchin-shaped ZnO nanowires prepared according to an embodiment may be identified from FIG. 8.

What is claimed is:

1. A method for preparing a sea urchin-shaped zinc oxide (ZnO) nanowire, the method comprising:
preparing a mixture of a ZnO nano-powder and a graphite powder; and
irradiating the mixture, in a container, with a microwave.

2. The method of claim 1, wherein the graphite powder is an expanded graphite powder.

3. The method of claim 2, wherein the expanded graphite powder is an expanded graphite powder sieved using a screen of 70 mesh to 90 mesh.

4. The method of claim 1, wherein the container is an alumina crucible.

5. The method for claim 1, wherein 1 part by weight to 20 parts by weight of the graphite powder are mixed with 100 parts by weight of the ZnO nano-powder.

6. The method of claim 1, further comprising, after preparing the mixture, ball-milling the mixture.

7. The method of claim 6, wherein the ball-milling is performed for 10 minutes to 60 minutes.

8. The method of claim of claim 1, wherein irradiating the mixture in the container with the microwave is repeated five times to 20 times, for 10 seconds to 60 seconds for each time.

9. The method of claim 8, further comprising stirring the mixture between the times of irradiating the mixture in the container with the microwave.

10. The method of claim 1, further comprising generating carbon oxide gas from the graphite powder in the mixture by energy of the microwave.

11. The method of claim 10, wherein the container includes a lid, and the method further comprises:
increasing an internal pressure of the container up to 1 atmosphere to 5 atmospheres by the carbon oxide gas; and
randomly creating ZnO nuclei and the ZnO nanowires from the ZnO nano-powder in the mixture by opening the lid of the container with the increased internal pressure to thus reduce the internal pressure to atmospheric pressure.

12. The method of claim 1, further comprising creating a spark from the graphite powder in the mixture by energy of the microwave.

13. The method of claim 12, further comprising:
turning a whole or part of the ZnO nano-powder in the mixture into a dynamic state by the spark; and
randomly creating ZnO nuclei and the ZnO nanowires from the ZnO nano-powder in the dynamic state.

14. The method of claim 1, further comprising generating carbon oxide gas and zinc (Zn) gas from the mixture by energy of the microwave.

15. The method of claim 14, further comprising randomly creating ZnO nuclei and the ZnO nanowires from the Zn gas.

* * * * *